(No Model.)

T. A. GALT.
POTATO PLANTER.

No. 592,607. Patented Oct. 26, 1897.

Witnesses
F. L. Durand
A. K. Williams Jr.

Inventor
Thomas A Galt
By Jno. G. Manahan
his Attorney

UNITED STATES PATENT OFFICE.

THOMAS A. GALT, OF STERLING, ILLINOIS.

POTATO-PLANTER.

SPECIFICATION forming part of Letters Patent No. 592,607, dated October 26, 1897.

Application filed June 5, 1897. Serial No. 639,502. (No model.)

*To all whom it may concern:*

Be it known that I, THOMAS A. GALT, a citizen of the United States, residing at Sterling, in the county of Whiteside and State of Illinois, have invented certain new and useful Improvements in Potato-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in potato-planters; and it consists in the employment of certain novel mechanism for distributing and dropping the seed at regular intervals, together with other devices for opening the furrow for the seed, closing such furrow after the seed is deposited therein, and rolling the surface of the newly-planted furrow. This is all accomplished at one operation.

The object of my invention is to provide a simple, efficient, and cheap machine adapted to the wants of those who cultivate comparatively few acres of potatoes and who are therefore indisposed to make the outlay necessary for the purchase of the larger and more expensive machines.

I attain the above object by the use of the mechanism illustrated in the accompanying drawings, in which—

Figure 1:
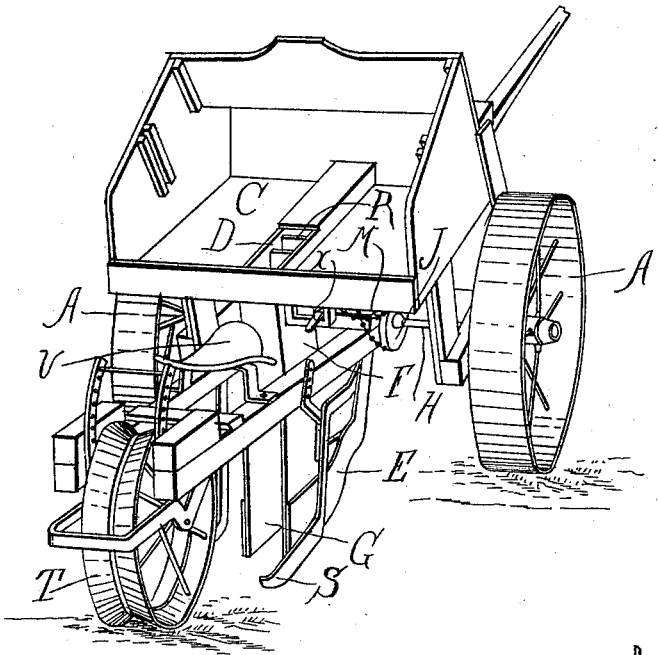
Figure 3:
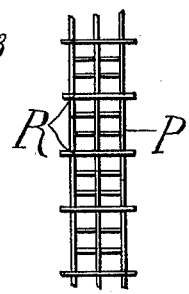
Figure 2:
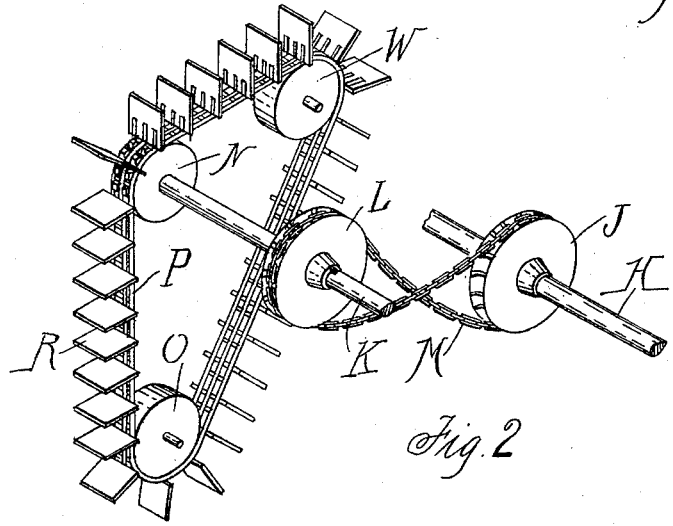

Figure 1 is a perspective of a machine embodying my invention. Fig. 2 is a detail of the mechanism employed for conveying and depositing the seed. Fig. 3 is a detail of a section of the seed-carrying chain, exhibiting the partitions between the seed-cups.

Similar letters refer to similar parts throughout the several views.

A A are the two ground-wheels of the machine, which serve also as driving-wheels for the seeding mechanism. Between the wheels A A is suitably seated a seed-hopper C, provided in its bottom with longitudinal openings D of the width of the seed-carriers hereinafter mentioned. A furrow-opener E is suitably attached to the frame of the machine, so as to enter the earth and open the furrow-gash slightly in the rear of a point midway between the carrying-wheels A A. The furrow-opener E is pivotally attached to the machine at its forward end, so as to be susceptible of being raised or suspended at the ends of the field or in transportation to and from the latter. A vertical seed-duct F communicates at its upper end with the rear end of the opening D in the seed-hopper C and at its lower end with the seed-passage G, formed in the rear of the furrow-opener E. One of the wheels A A is rigidly seated on a common axle H, upon which latter there is also rigidly seated the driving sprocket-wheel J. Slightly to the rear and somewhat above the axle H is journaled the transverse shaft K, near one end of which is keyed the sprocket-pinion L. A sprocket-chain M, uniting the wheel J and pinion L, imparts rotary motion to the shaft K, on the opposite end of which latter there is rigidly seated a comparatively broad-faced sprocket-wheel N. At a suitable point in the lower end of the vertical seed-duct F and directly below the wheel N is journaled a loose wheel O of a proper size to carry the lower end of the sprocket-chain P. Under the hopper C and directly in front, and on the same horizontal plane as the wheel N, is suitably seated a carrying-wheel W for the purpose of delivering the chain P to the wheel N in a horizontal position, so that said chain will move under slot D of hopper C in a horizontal direction. The chain P encircles the wheels N, W, and O and is driven by the sprocket-wheel N. On the chain P at suitable intervals are rigidly attached, perpendicular to said chain, the wings or seed-partitions R. It will be noticed that the chain M being crossed the rotation of the shaft K is of a direction opposite to that of the shaft H, which in the progress of the machine has the effect of causing the wings R to traverse the opening D in the hopper C and then in a direction toward the rear of the machine and also to pass downward through the seed-duct F to act as movable and descending valves in said seed-duct. After the seed is deposited in the furrow the wings S S draw the earth over the seed and the surface is rolled by the follower-wheel T.

The operation of my invention is as follows: The driver rides on the front of the machine. The seed is placed in the hopper C, so as to leave the latter exposed, and the dropper, riding on the rear seat V, directly behind the opening D, picks up the potatoes from the sides of the hopper C and drops one between each of the wings R in succession. The latter carry the seed thus placed between them slowly down the seed-duct F, releasing or dropping the same in succession through the lower portion of the seed-opening G into the furrow. The frequency of the deposit of the seed can be regulated by the comparative size of the wheels J and L and N regulating the velocity of the chain P. After the seed is deposited the wings S draw in the walls of the furrow over the seed and the wheel T rolls and packs the same. The usual clutch-lever X can be employed to slide the wheel L to a smooth part of the shaft K, and thus temporarily throw the machine out of gear.

When the rear of the machine is raised, the seed-duct F telescopes in the boot of the runner E.

What I claim as my invention, and desire to secure by Letters Patent of the United States, is—

1. In a potato-planter, the combination of the carrying and driving wheels A A, the seed-hopper C provided in its base with a longitudinal opening D, the furrow-opener E provided with a vertical seed-passage G at its rear end, the vertical seed-duct F communicating through the opening D of the seed-hopper C with the vertical seed-passage G aforesaid, wheels N and W seated on the frame of the machine in line, and in the same vertical plane with each other, and adapted to rotate in the line of movement of the machine with their upper carrying-surfaces moving toward the rear of the machine, wheel O seated beneath wheels N and W, but in the same vertical plane with the latter, chain P provided with wings R and carried on said wheels W, N, and O beneath said opening D and suitable means for progressing said chain in a direction contrary to the movement of the machine, substantially as shown and for the purpose described.

2. In a potato-planter, the combination of a suitable frame, wheels A A supporting the latter, a hopper C provided in its base with longitudinal opening D, furrow-opener E provided in its rear end with the vertical seed-passage G, a vertical seed-duct F connecting said seed-passage G with said opening D, and having the upper part of its front wall removed, chain P adapted to be driven longitudinally of the machine and toward the rear thereof under the opening D, and provided with wings R adapted to pass loosely down the seed-duct F and carry the seed, in certain fixed relations, from the hopper C to the seed-passage G, axle H, driving sprocket-wheel J, seated thereon, rotating shaft K provided with sprocket-pinion L, chain M uniting the sprocket-wheel J to the sprocket-pinion L, and the sprocket-wheel N rigidly seated on shaft K and adapted to carry and drive the chain P contrary to the movement of the machine, substantially as shown and for the purpose described.

In testimony whereof I affix my signature in presence of two witnesses.

THOMAS A. GALT.

Witnesses:
JOHN G. MANAHAN,
ISABELLE MANAHAN.